(12) United States Patent
Lee

(10) Patent No.: US 12,541,296 B2
(45) Date of Patent: Feb. 3, 2026

(54) FINANCIAL SERVICE PROVIDING METHOD USING VISUALIZED FINANCIAL RELATIONSHIP CONTENT-BASED UI, FINANCIAL SERVICE PROVIDING APPARATUS FOR PERFORMING SAME, AND RECORDING MEDIUM HAVING SAME RECORDED THEREIN

(71) Applicant: FINDDY INC., Seoul (KR)

(72) Inventor: Dong Hee Lee, Seoul (KR)

(73) Assignee: FINDDY INC., Seoul (KR)

( * ) Notice: Subject to any disclaimer, the term of this patent is extended or adjusted under 35 U.S.C. 154(b) by 0 days.

(21) Appl. No.: 18/041,591

(22) PCT Filed: Aug. 12, 2021

(86) PCT No.: PCT/KR2021/010726
§ 371 (c)(1),
(2) Date: Feb. 14, 2023

(87) PCT Pub. No.: WO2022/035252
PCT Pub. Date: Feb. 17, 2022

(65) Prior Publication Data
US 2023/0289052 A1    Sep. 14, 2023

(30) Foreign Application Priority Data
Aug. 14, 2020   (KR) .................. 10-2022-0102345

(51) Int. Cl.
*G06F 3/00*   (2006.01)
*G06F 3/0481*   (2022.01)
(Continued)

(52) U.S. Cl.
CPC .......... *G06F 3/0488* (2013.01); *G06F 3/0481* (2013.01); *G06F 3/04842* (2013.01); *G06F 3/04883* (2013.01); *G06Q 40/02* (2013.01)

(58) Field of Classification Search
CPC .. G06F 3/0488; G06F 3/0481; G06F 3/04842; G06F 3/04883; G06Q 40/02
See application file for complete search history.

(56) References Cited

U.S. PATENT DOCUMENTS

| 8,611,968 B2 * | 12/2013 | Yang | .................. | G06F 3/04817 |
| | | | | 455/566 |
| 9,020,965 B1 * | 4/2015 | Sehrer | .................. | G06Q 50/01 |
| | | | | 707/758 |

(Continued)

FOREIGN PATENT DOCUMENTS

| KR | 10-0914660 B1 | 8/2009 |
| KR | 10-2015-0048831 A | 5/2015 |

(Continued)

OTHER PUBLICATIONS

International Search Report issued in PCT/KR2021/010726; mailed Nov. 11, 2021, 4 pages English translation, 4 pages.

*Primary Examiner* — Wilson W Tsui
*Assistant Examiner* — David Faber
(74) *Attorney, Agent, or Firm* — Studebaker Brackett PLLC

(57) ABSTRACT

A financial service providing method and a financial service providing apparatus for providing a user interface including a visualized financial relationship content visualizing a financial relationship between a user and a subject for financial transaction. The method and the apparatus can detect a touch input signal input by the user, and output financial information corresponding to the touch input signal. The method and the apparatus can performs grouping and defining subjects for financial transaction associated with each of overlapping graphic objects, generating a joint asset management group identification object of the grouped subjects, displaying the joint asset management group identification object with photo images of the grouped subjects, (Continued)

and updating the visualized financial relationship content in response to the grouped subjects and the generated joint asset management group identification object, to improve user convenience.

12 Claims, 14 Drawing Sheets

(51) Int. Cl.
*G06F 3/04842* (2022.01)
*G06F 3/0488* (2022.01)
*G06F 3/04883* (2022.01)
*G06Q 40/02* (2023.01)

(56) References Cited

U.S. PATENT DOCUMENTS

| | | | |
|---|---|---|---|
| 11,552,916 B2* | 1/2023 | Brezina | H04M 15/44 |
| 2008/0300979 A1* | 12/2008 | Abhyanker | G06Q 30/0277 |
| | | | 705/14.67 |
| 2009/0307604 A1* | 12/2009 | Giles | G06Q 10/10 |
| | | | 715/751 |
| 2010/0062753 A1* | 3/2010 | Wen | H04M 1/576 |
| | | | 455/418 |
| 2011/0258139 A1* | 10/2011 | Steiner | G06Q 40/06 |
| | | | 705/37 |
| 2012/0290989 A1* | 11/2012 | Li | G06Q 10/0635 |
| | | | 715/853 |
| 2013/0257859 A1* | 10/2013 | Sato | G06T 19/00 |
| | | | 345/419 |
| 2014/0040128 A1* | 2/2014 | Park | G06Q 20/108 |
| | | | 705/42 |
| 2014/0222663 A1* | 8/2014 | Park | G06Q 20/027 |
| | | | 705/39 |
| 2015/0026120 A1* | 1/2015 | Chrapko | G06F 16/904 |
| | | | 707/748 |
| 2016/0034562 A1* | 2/2016 | Malcolm-Dacosta | |
| | | | H04L 51/212 |
| | | | 707/740 |
| 2016/0104133 A1* | 4/2016 | Davis | G06Q 20/10 |
| | | | 705/39 |
| 2016/0165128 A1* | 6/2016 | Krug | H04N 23/62 |
| | | | 348/207.1 |
| 2017/0295121 A1* | 10/2017 | Zhang | G06F 16/24578 |

FOREIGN PATENT DOCUMENTS

| | | |
|---|---|---|
| KR | 10-2017-0065511 A | 6/2017 |
| KR | 10-2018-0027770 A | 3/2018 |
| KR | 10-2018-0117262 A | 10/2018 |
| KR | 10-2020-0021705 A | 3/2020 |
| WO | WO-2018179586 A1 * 10/2018 | ......... G06Q 30/0185 |

* cited by examiner

|  |  |  |  |  |
|---|---|---|---|---|
| Tap | Double Tap | Long Press | Zoom | Pinch |
|  |  |  |  |  |
| Rotate | Swipe Right | Swipe Left | Swipe Up | Swipe Down |

FINANCIAL SERVICE PROVIDING METHOD USING VISUALIZED FINANCIAL RELATIONSHIP CONTENT-BASED UI, FINANCIAL SERVICE PROVIDING APPARATUS FOR PERFORMING SAME, AND RECORDING MEDIUM HAVING SAME RECORDED THEREIN

CROSS-REFERENCE TO RELATED APPLICATIONS

This application is the U.S. National Stage of International Application No. PCT/KR2021/010726 filed Aug. 12, 2021, which claims the priority of Korean Patent Application No. 10-2022-0102345 filed on Aug. 14, 2020, in the Korean Intellectual Property Office, the disclosure of which is incorporated herein by reference.

TECHNICAL FIELD

The present invention relates to a financial service providing technology capable of supporting financial information providing service and financial transaction service through a mobile terminal carried by a user, and more particularly, to a financial service providing method using a visualized financial relationship content-based UI capable of maximizing user convenience, a financial service providing apparatus for performing the same, and a recording medium having the same recorded therein.

BACKGROUND ART

In recent years, with the development of wireless communication networks and the wide spread of mobile terminals such as smart phones and tablet PCs, technologies capable of conveniently receiving financial services without visiting a bank have been proposed. For example, a user can check various types of financial information such as balance information and transaction history using a financial service application installed in a mobile terminal, and can also perform financial transactions such as account transfer and credit card payment.

Various technologies related to such a financial service providing technology are being provided. Korean Patent Publication No. 914, 660 relates to a technology that provides account transfer service between messenger users, and includes the steps of linking and processing messenger account information and messenger-linked account information of a plurality of messenger-using customers in a financial company server and storing the messenger account information and messenger-linked account information in a storage medium; selecting a specific messenger account to be transferred through a friend list of the messenger when requesting amount transfer to a specific messenger account from a messenger-using terminal authenticated as a messenger banking member through the messenger server; confirming, by the financial company server, messenger-linked account information linked with a messenger account of a customer using the messenger-using terminal and messenger-linked account information linked with the selected specific messenger account by linking with the storage medium; and withdrawing, by the financial company server, transfer amount requested by the messenger-using terminal from the messenger-linked account linked with the messenger account of the confirmed customer using the messenger-using terminal and then depositing the transfer amount into a messenger-linked account linked with the specific messenger account.

Here, the conventional related art including the above related document focuses on a method of providing financial information to users or providing services supporting financial transactions by linking to a financial company server, but does not show the effect of further improving user convenience. More specifically, in order for a user to receive financial services, a process of inputting specific information or selecting specific subject by manipulating a mobile terminal is essential, but there is a limit to manipulating the mobile terminal more easily and quickly. The present applicant has been aware of the problems with the related art and has come up with the present application.

DISCLOSURE

Technical Problem

Accordingly, the present invention has been devised to solve the above-described problems, and provides a financial service providing method using a visualized financial relationship content-based UI capable of maximizing user convenience, a financial service providing apparatus for performing the same, and a recording medium having the same recorded therein.

Other objects of the present invention will become clearer through the preferred embodiments described below.

Technical Solution

According to the present invention, a financial service providing method using a visualized financial relationship content-based user interface (UI) is performed in a financial service providing apparatus. Here, the financial service providing method comprises the steps of: providing a user interface on a touch screen, the user interface including visualized financial relationship content obtained by visualizing a financial relationship between a user and a subject for financial transaction of the user; detecting a touch input signal input by the user through the user interface; and outputting financial information corresponding to the detected user's touch input, through the user interface.

The outputting of the financial information through the user interface may include requesting financial information corresponding to the detected touch input signal from a financial service providing server connected through a network to output the financial information received from the financial service providing server through the user interface.

The visualized financial relationship content may include a first identification object associated with the user and a plurality of second identification objects associated with the subject for financial transaction, and the financial relationship between the user and the subject for financial transaction may be visualized using the first and second identification objects.

The first identification object may be arranged at a predefined position, and each of the plurality of second identification objects may be arranged at a position spaced apart from the first identification object, and the first identification object and each of the plurality of second identification objects may be configured to be connected in a star shape through a link object.

The touch input signal may include, as a touch input signal for at least one of the first identification object and the plurality of second identification objects, at least one of a single-tap touch input, a double-tap touch input, a long touch input, and a swipe touch input.

The outputting of the financial information through the user interface may further include, when a touch input signal corresponding to a request for outputting financial transaction information between the user and the subject for financial transaction is detected as a touch input signal for the first identification object, updating the visualized financial relationship content based on the financial transaction information.

The updating of the visualized financial relationship content may include visually changing at least one of the plurality of second identification objects and the link object in response to at least one of a transaction amount and a transaction frequency between the user and the subject for financial transaction.

The outputting of the financial information through the user interface may further include, when the second identification object moves by a swipe touch input to any one of the plurality of second identification objects to at least partially overlap other second identification objects, grouping and defining subjects for financial transaction associated with each of the overlapping second identification objects, and updating the visualized financial relationship content in response to the grouping.

The outputting of the financial information through the user interface may further include, when the second identification object moves by a swipe touch input to any one of the plurality of second identification objects to at least partially overlap the first identification object, grouping and defining the subject for financial transaction associated with the user and the corresponding second identification object as a joint asset manager, and updating the visualized financial relationship content in response to the grouping.

The outputting of the financial information through the user interface may further include, when the first identification object moves by a swipe touch input to the first identification object to at least partially overlap any one of the second identification objects, generating remittance request information for remitting a predetermined amount to a subject for financial transaction associated with the overlapping second identification object, and transmitting the remittance request information to a financial service providing server or a financial institution server.

The user interface may include messenger content in which financial transaction history information between the user and the subject for financial transaction is visualized in an interactive format.

The outputting of the financial information through the user interface may further include, when a touch input signal corresponding to a request for outputting financial transaction information between the user and the subject for financial transaction is detected as a touch input signal for any one of the plurality of second identification objects, outputting the financial transaction information between the corresponding subjects for financial transactions in the interactive format through the messenger contents.

A financial service providing apparatus for performing a financial service providing method using a visualized financial relationship content-based user interface (UI) includes: a data processing unit configured to provide a user interface on a touch screen, the user interface including visualized financial relationship content obtained by visualizing a financial relationship between a user and a subject for financial transaction of the user; and a touch input detecting unit configured to detect a touch input signal input by the user through the user interface, in which the data processing unit may output financial information corresponding to the detected user's touch input, through the user interface.

The financial service providing apparatus may further include a linkage unit configured to request financial information corresponding to the detected touch input signal to a financial service providing server connected through a network and receive the corresponding financial information from the financial service providing server and provide the received financial information to the data processing unit.

A recording medium having a computer program on a financial service providing method using a visualized financial relationship content-based user interface (UI) performed in a financial service providing apparatus, in which the financial service providing method includes the functions of: providing a user interface on a touch screen, the user interface including visualized financial relationship content obtained by visualizing a financial relationship between a user and a subject for financial transaction of the user; detecting a touch input signal input by the user through the user interface; and outputting financial information corresponding to the detected user's touch input, through the user interface.

Advantageous Effects

The present invention is configured such that specific information is requested by a user and the corresponding information is output through a user interface including visualized financial relationship content obtained by visualizing a financial relationship between a user and a subject for financial transaction, and thus user convenience can be maximized.

BEST MODE

Since the present invention may be variously modified and have several exemplary embodiments, specific exemplary embodiments will be shown in the accompanying drawings and be described in detail in a detailed description. However, it is to be understood that the present invention is not limited to the specific exemplary embodiments, but includes all modifications, equivalents, and substitutions included in the spirit and the scope of the present invention. When it is determined that a detailed description for any known art related to the present invention may obscure the gist of the present invention, the detailed description will be omitted.

Terms used in the specification, 'first', 'second', etc., may be used to describe various components, but the components are not to be interpreted to be limited to the terms. The terms are used only to distinguish one component from another component.

Terms used in the present specification are used only in order to describe specific exemplary embodiments rather than limiting the present invention. Singular forms are intended to include plural forms unless the context clearly indicates otherwise. It will be further understood that the terms "comprises" or "have" used in this specification, specify the presence of stated features, steps, operations, components, parts mentioned in this specification, or a combination thereof, but do not preclude the presence or addition of one or more other features, numerals, steps, operations, components, parts, or a combination thereof. Hereinafter, embodiments of the present invention will be described in detail with reference to the accompanying drawings.

Figure 1:
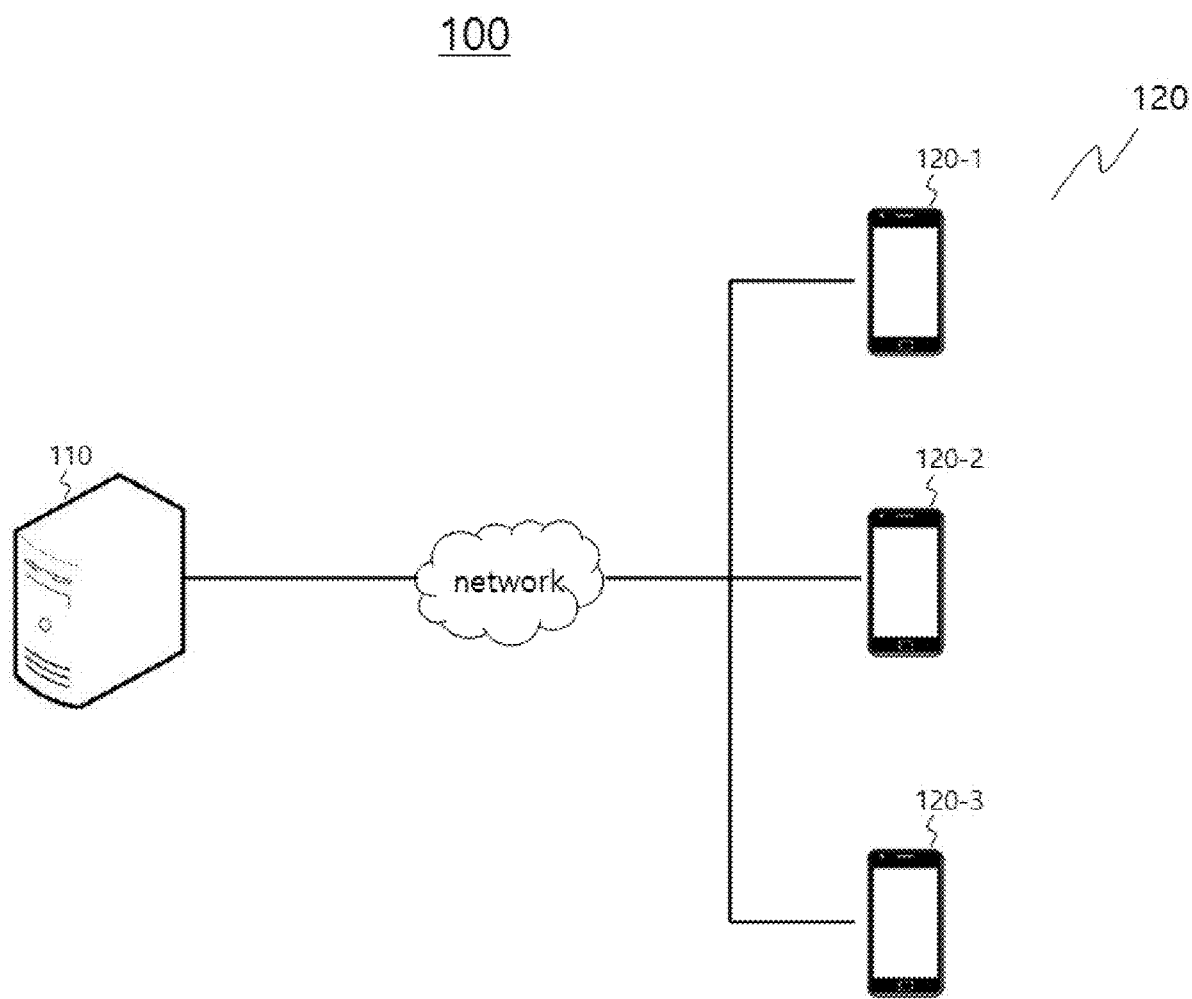
FIG. 1 is a reference diagram for describing a financial service providing system according to the present invention.

FIG. 1 is a reference diagram for describing a financial service providing system according to the present invention.

Referring to FIG. 1, a financial service providing system 100 according to the present invention includes a financial service providing server 110 and a financial service providing apparatus 120. Here, the financial service providing server 110 and the financial service providing apparatus 120 may be connected through a network. In one embodiment, the financial service providing server 110 may be connected to a plurality of financial service providing apparatuses 120-1, 120-2, and 120-3, through a network.

The financial service providing server 110 is a computing device managed by a financial service provider, and may be connected to the financial service providing apparatus 120 through the network to operate to retrieve or generate information requested (queried) from the financial service providing apparatus 120 according to the present invention and transmit the retrieved or generated information to the financial service providing apparatus 120.

In one embodiment, the financial service providing server 110 may be connected to a financial institution server (e.g., account information, transaction history information, balance information, etc.), which manages user's financial information, through a network to receive user's financial information from financial institution servers (e.g., bank server, credit card company server, etc.) or receive the user's financial information from the financial service providing apparatus 120.

Meanwhile, since the user's financial information is generally stored in a financial institution, it is preferable that the financial service providing server 110 according to the present invention directly receives the financial information by linking with the corresponding financial institution server. However, when the financial information is not directly received from the financial institution server, the financial service providing apparatus 120 may preferentially receive the user's financial information according to the user authentication and provides the received financial information to the financial service providing server 110 such that the financial service providing server 110 may confirm the user's financial information.

Meanwhile, in the present invention, the process, method, path, etc., of confirming financial information of a specific user do not correspond to the core technical idea of the present invention, and may be implemented in various ways as needed.

In one embodiment, the financial service providing server 110 is connected to a financial institution server (e.g., a bank company server, a credit card company server, etc.) through a network, and transmits financial transaction request information requested by a user to the financial institution server, thereby performing financial transactions desired by the user (e.g., account transfer, card payment, etc.).

The financial service providing apparatus 120 is a computing device carried, managed or manipulated by a user. Here, the financial service providing apparatus 120 according to the present invention is a computing device including a touch screen capable of recognizing a user's touch input, and may correspond to, for example, a mobile terminal such as a smart phone or a tablet PC. However, these examples are not intended to limit the scope of the present invention, and any computing device equipped with a touch screen should be interpreted as the financial service providing apparatus 120 according to the present invention.

In one embodiment, the financial service providing server 110 may provide data in which a program related to a financial service providing method according to the present invention is recorded, to the financial service providing apparatus 120 For example, the financial service providing apparatus 120 may download and install a mobile application in which the financial service providing method according to the present invention is implemented from an application market (e.g., Android: market, etc.), and receive a financial service according to the present invention through the corresponding mobile application.

Here, the financial service providing apparatus 120 may request (query) specific information through a user interface that links with the financial service providing server 110, and receive corresponding information (e.g., transaction history information, balance information, asset status information, etc.) and output the corresponding information according to a predefined layout.

Hereinafter, the present invention and financial service providing technology according to various embodiments of the present invention will be described in more detail with reference to the accompanying drawings.

Figure 2:
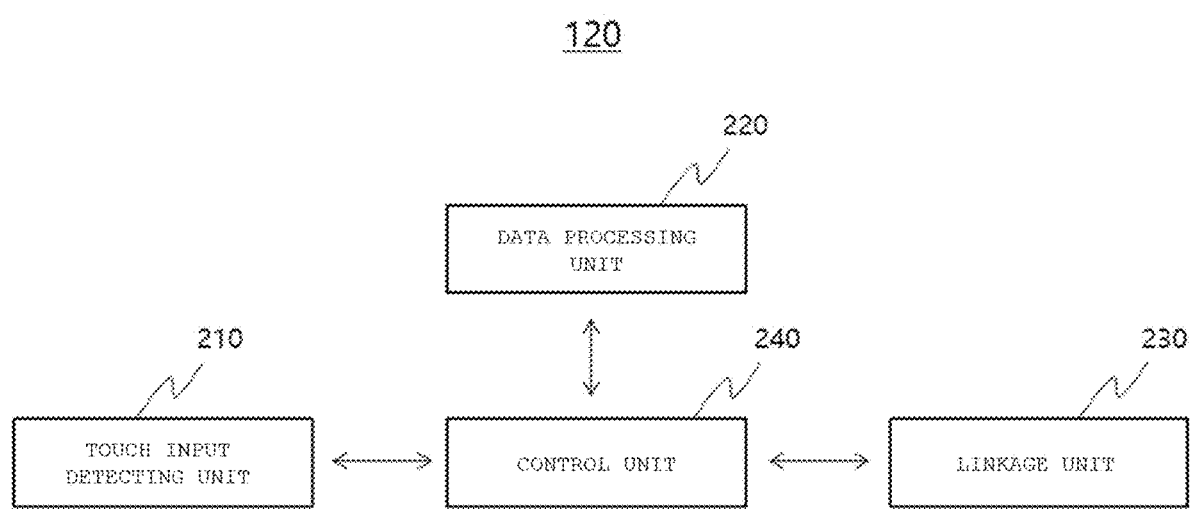
FIG. 2 is a block diagram for describing a financial service providing apparatus according to an embodiment of the present invention.

FIG. 2 is a block diagram for describing a financial service providing apparatus according to an embodiment of the present invention.

Referring to FIG. 2, the financial service providing apparatus 120 may include a touch input detecting unit 210, a data processing unit 220, a linkage unit 230, and a control unit 240.

The touch input detecting unit 210 detects a touch input signal input by a user. Here, the touch input detecting unit 210 may be connected to a touch screen provided in the financial service providing apparatus 120 to detect a touch input signal according to a user's touch input.

Figure 4:
FIGS. 4 to 14 are reference diagrams for describing the financial service providing method according to the embodiment of the present invention.
Figure 4:
Figure 4:
Figure 4:
Figure 4:
Figure 4:
Figure 4:
Figure 4:
Figure 4:
Figure 4:

In one embodiment, the touch input signal may include at least one of a single tap touch input, a double tap touch input, a long touch input, a zoom touch input, a pinch touch input, a rotation touch input, and a swipe touch input, as illustrated in FIG. 4. Meanwhile, FIG. 4 is a schematic diagram of a user's touch input behavior in order to explain a touch input signal according to the present invention, and it should be noted that the touch input signal is content not output on the touch screen.

The data processing unit 220 provides a predefined user interface on the touch screen. Here, the user interface includes content composed of at least one combination of texts, figures, lines, icons, and images according to a predefined layout, is provided on a touch screen, and may refer to an object that is provided on a touch screen to output specific information so that a user may recognize the specific information and to receive an information request signal corresponding to a user's touch input signal.

Figure 5:
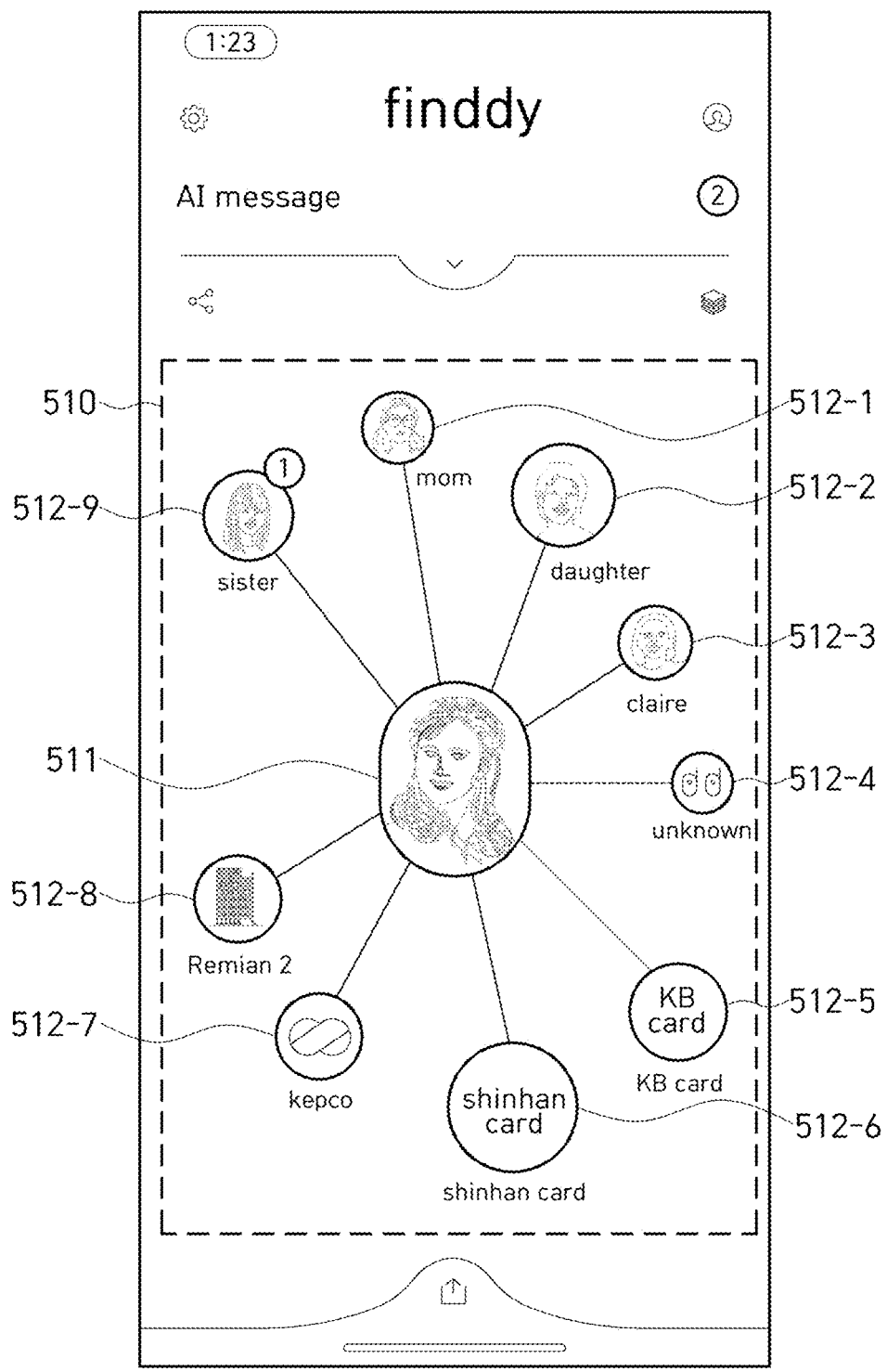

The user interface according to the present invention may include visualized financial relationship content that visualizes a financial relationship between a user and a subject for financial transaction of the user. Hereinafter, a user interface including visualized financial relationship content according to the present invention will be described in more detail with reference to FIG. 5. FIG. 5 is a reference for describing a user interface according to an embodiment of the present invention, and is an example of a user interface output on a touch screen.

Referring to FIG. 5, the user interface may include visualized financial relationship content 510. Here, the visualized financial relationship content 510 may refer to an object visualized by combining at least one of texts, figures, lines, icons, and images of the financial relationship between the user and the subject for user's financial transaction.

In one embodiment, the visualized financial relationship content 510 may include an identification object associated with a specific person. Here, the identification object is a visualization object for recognizing a specific person, and may be implemented as a combination of at least one of texts, photos, images, and icons representing the specific person.

In one embodiment, the visualized financial relationship content 510 may include a first identification object 511 associated with a user. Referring to FIG. 5, the first identification object 511 may include a photo image of a user having a predefined area and shape.

In one embodiment, the visualized financial relationship content 510 may include a plurality of second identification objects 512-1, 512-2, 512-3, 512-4, 512-5, 512-6, 512-7, 512-8, and 512-9, associated with the subject for user's financial transaction. Referring to FIG. 5, the second identification object is implemented as a combination of a photo image and text (e.g., name, nickname, relationship) of a subject for financial transaction, or implemented as a combination of an icon and a text (e.g., financial institution name, etc.) representing a subject for financial transaction. Here, the subject for financial transaction may mean a natural person, a corporation, an institution, etc., that has a financial transaction (e.g., remittance, withdrawal, card payment, etc.) relationship with a user.

In one embodiment, the visualized financial relationship content 510 may be configured to visualize a financial relationship between a user and a subject for financial transaction using the first identification object 511 and the second identification object. As an example, as illustrated in FIG. 5, the first identification object 511 is arranged at a predefined location, and each of the plurality of second identification objects 512-1, 512-2, 512-3, 512-4, 512-5, 512-6, 512-7, 512-8, and 512-9, may be arranged at a position spaced apart from the first identification object 511, and each of the first identification object 511 and the plurality of second identification objects 512-1 to 512-9 may be configured to be connected in a star shape through a link object. Here, the link object is an object connecting the first identification object 511 and each of the plurality of second identification objects 512-1 to 512-9, and as illustrated in FIG. 5, may be implemented as a line having a predefined thickness. Meanwhile, these examples are not intended to limit the scope of the present invention, and it goes without saying that the first and second identification objects and the link object may be implemented in various ways.

According to the present invention, by providing a user interface configured to include the visualized financial relationship content 510 on the touch screen, it is possible for a user to intuitively recognize a financial relationship between himself and a subject for financial transaction.

The touch input detecting unit 210 may detect a touch input signal for at least one of the first identification object 511 and the plurality of second identification objects 512-1 to 512-9. That is, the user may request an output of specific financial information or request a financial transaction by touching at least one of the first identification object 511 and the plurality of second identification objects 512-1 to 512-9 on the touch screen.

The data processing unit 220 outputs the financial information corresponding to the user's touch input detected by the touch input detecting unit 210 through the user interface.

In one embodiment, the financial information output through the user interface may include at least one of financial transaction information (e.g., deposit and withdrawal history between a user and a specific person, user's card history information for a specific card company, etc.) between a user and a subject for financial transaction, user's account history information, and asset status information.

In one embodiment, the linkage unit 230 may request financial information corresponding to the touch input signal detected by the touch input detecting unit 210 from the financial service providing server 110, and receive corresponding financial information from the financial service providing server 110 and provide the received corresponding financial information to the data processing unit 220.

In one embodiment, when a touch input signal corresponding to a request for outputting financial transaction information between a user and a subject for financial transaction is detected as the touch input signal for the first identification object 511, the data processing unit 220 may update the visualized financial relationship content based on the financial transaction information.

Figure 6:
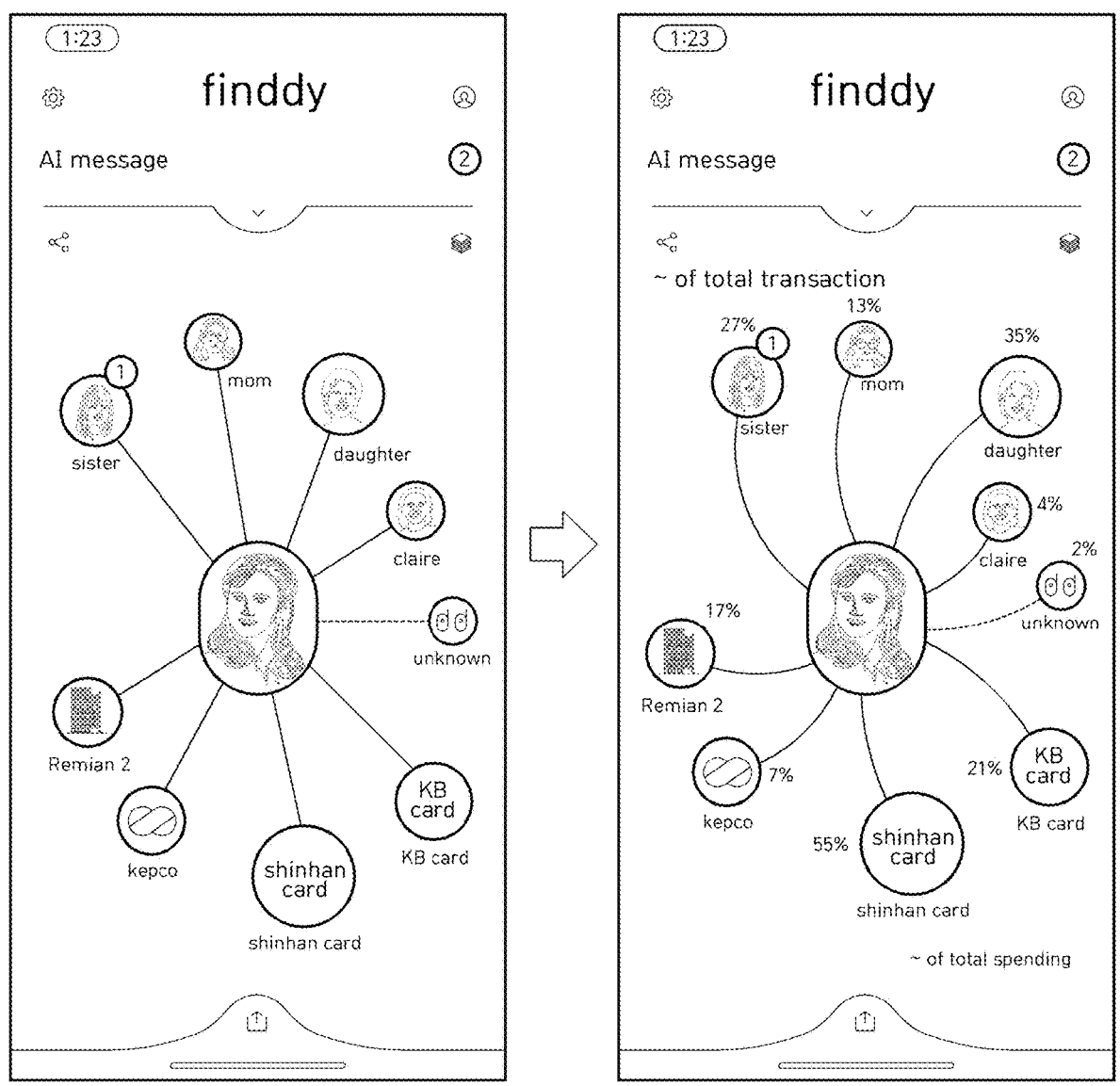

For example, referring to FIG. 6, when the long touch input signal for the first object 510 is defined as an output request signal of transaction frequency information between a user and a subject for financial transaction, if the long touch input signal for the first object 510 is detected by the touch input detecting unit 210, the data processing unit 220 may receive transaction frequency information with each subject for financial transaction from the financial service providing server 110 and update the received transaction frequency information by including the received transaction frequency information in the visualized financial relationship content, and then displayed the updated received transaction frequency information to the touch screen. Here, the data processing unit 220 may update the visualized financial relationship content to include the transaction frequency (e.g., percentage) for each subject for financial transaction in each of the second identification objects 512-1 to 512-9.

In one embodiment, in the process of updating the visualized financial relationship content 510, the data processing unit 220 may visually change at least one of the plurality of second identification objects 512-1 to 512-9 and the link object in response to at least one of the transaction amount and transaction frequency between the user and the subject for financial transaction For example, the data processing unit 220 may change a size of the second identification objects 512-1 to 512-9 or thicknesses of link objects connected to each of the second identification objects 512-1 to 512-9 in proportion to the transaction amount or transaction frequency between the user and each subject for financial transaction. According to the present embodiment, it is possible for a user to intuitively recognize not only the financial relationship between the user and the subject for financial transaction, but also the financial transaction status with each subject for financial transaction.

In one embodiment, the data processing unit 220 may move the first or second identification object on the touch screen in response to the swipe touch input.

In one embodiment, when a specific second identification object moves by a swipe touch input to any one of the plurality of second identification objects 512-1 to 512-9 to at least partially overlap other second identification objects, the data processing unit 220 may group and define subjects for financial transactions associated with each of the overlapping second identification objects. Here, the data processing unit 220 may update and output the visualized financial relationship content 510 in response to the defined grouping.

Figure 7:
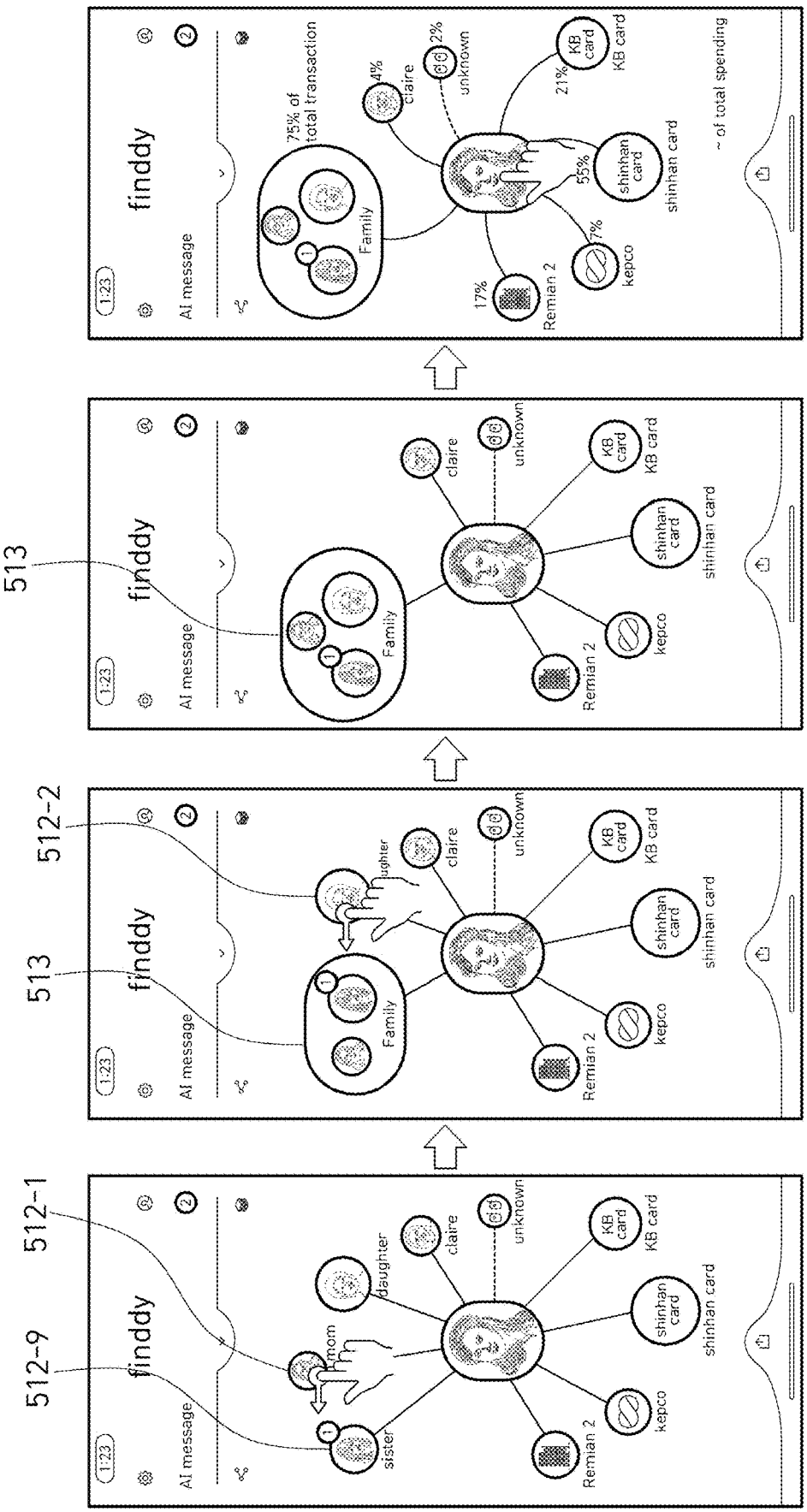

For example, referring to FIG. 7, the second identification object 512-1 corresponding to [mother] moves by the swipe touch input to at least partially overlap with the second identification object 512-9 corresponding to [older sister] the data processing unit 220 may group and define [mother] and [older sister]. Here, the data processing unit 220 may receive a group name (e.g., [family]) for the corresponding group from the user, generate a group identification object including the corresponding second identification objects, and update the visualized financial relationship content 510 to include the group identification object. Thereafter, when the second identification object 512-2 corresponding to [daughter] moves by the swipe touch input to at least partially overlap the group identification object 513, the data processing unit 220 may define to include [daughter] in the [family] group. Thereafter, when the long touch input signal for the first object 510 is defined as the output request signal of the transaction frequency information between the user and the subject for financial transaction, if the long touch input signal for the first object 510 is detected by the touch input detecting unit 210, the data processing unit 220 may update the visualized financial relationship content 510 by summing the transaction frequencies of each subject (mother, sister, daughter) for financial transaction included in the [family] group. Here, the data processing unit 220 may change the sizes of the second identification object and the group identification object or the thickness of the link object connected to the second identification object and the group identification object, respectively, in proportion to the transaction frequency between the user, the subject for financial transaction, and the subject for financial transaction group.

In one embodiment, when the corresponding second identification object moves by the swipe touch input to any one of the plurality of second identification objects 512-1 to 512-9 to at least partially overlap the first identification object 511, the data processing unit 220 may group and define the user and the subject for financial transaction associated with the second identification object as a joint asset manager. Here, the data processing unit 220 may update and output the visualized financial relationship content 510 in response to the defined grouping.

Figure 8:
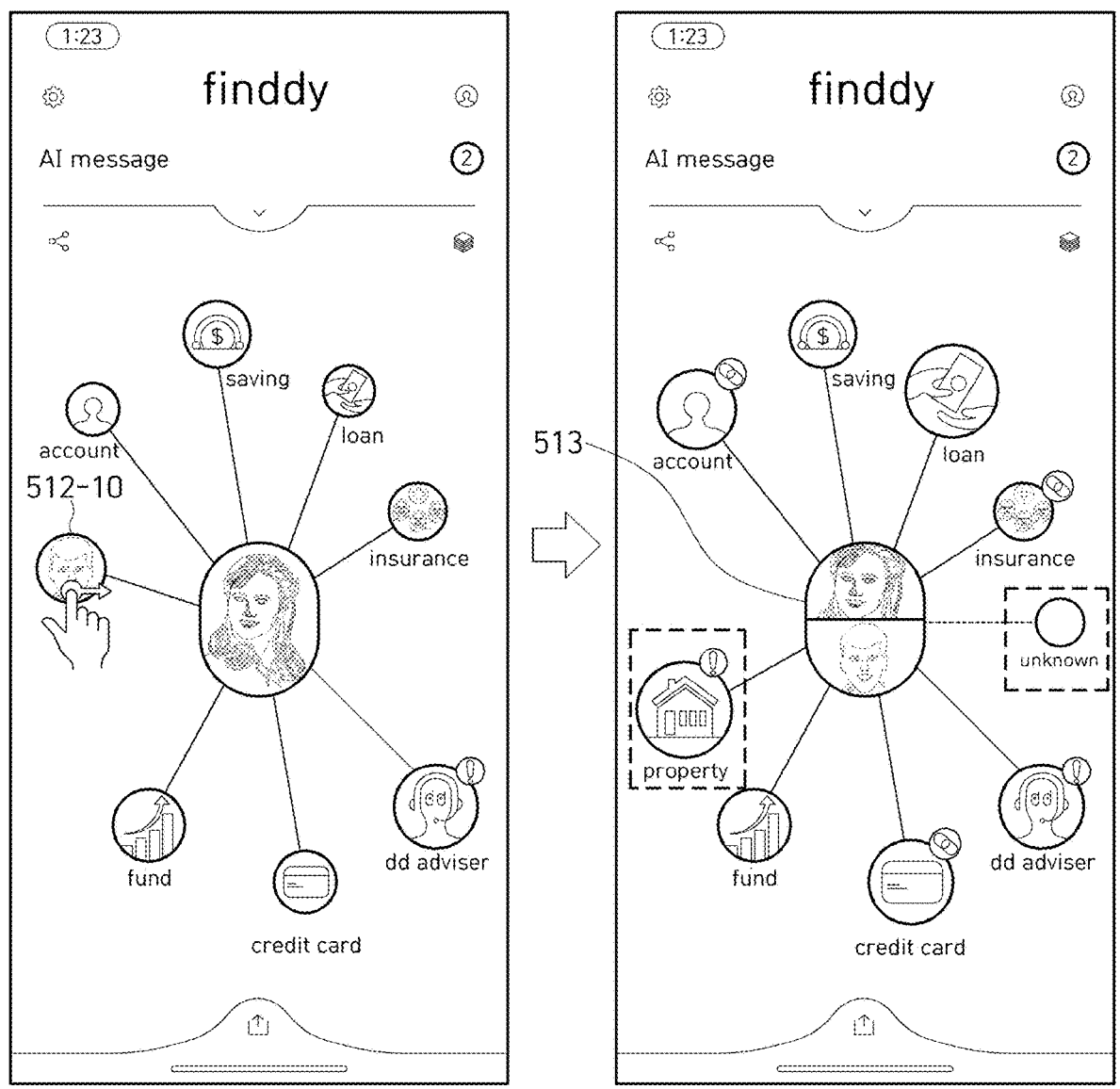

For example, referring to FIG. 8, when the second identification object 512-10 corresponding to [husband] moves by the swipe touch input to at least partially overlap the first identification object 511, the data processing unit 220 may group and define [user] and [husband] as a joint asset manager. Here, the data processing unit 220 may generate a joint asset management group identification object 513 including identification objects associated with each joint asset manager, and update the visualized financial relationship content to include the joint asset management group identification object 513. In addition, the data processing unit 220 may update the visualized financial relationship content 510 by summing asset information of [user] and [husband] included in the joint asset management group. In this case, the data processing unit 220 may update the visualized financial relationship content 510 to include asset information icons capable of confirming asset information associated with a joint asset upon touch input. In one embodiment, the asset information icon may include at least one of an account information icon, a savings information icon, a loan information icon, an insurance information icon, a credit card information icon, a fund information icon, a joint asset icon, a real estate information icon, and a vehicle information icon, and when a specific asset information icon is touched by a user, output common asset information corresponding to the corresponding icon.

In one embodiment, when the first identification object 511 moves by the swipe touch input to the first identification object 511 and partially overlaps any one of the plurality of second identification objects 512-1 to 512-9, the data processing unit 220 may generate remittance request information for remitting a certain amount to a subject for financial transaction associated with the overlapping second identification object. Here, the linkage unit 230 may transmit the remittance request information to the financial service providing server 110 or the financial institution server to cause the remittance of the corresponding amount to be carried out to the subject for financial transaction.

Figure 9:
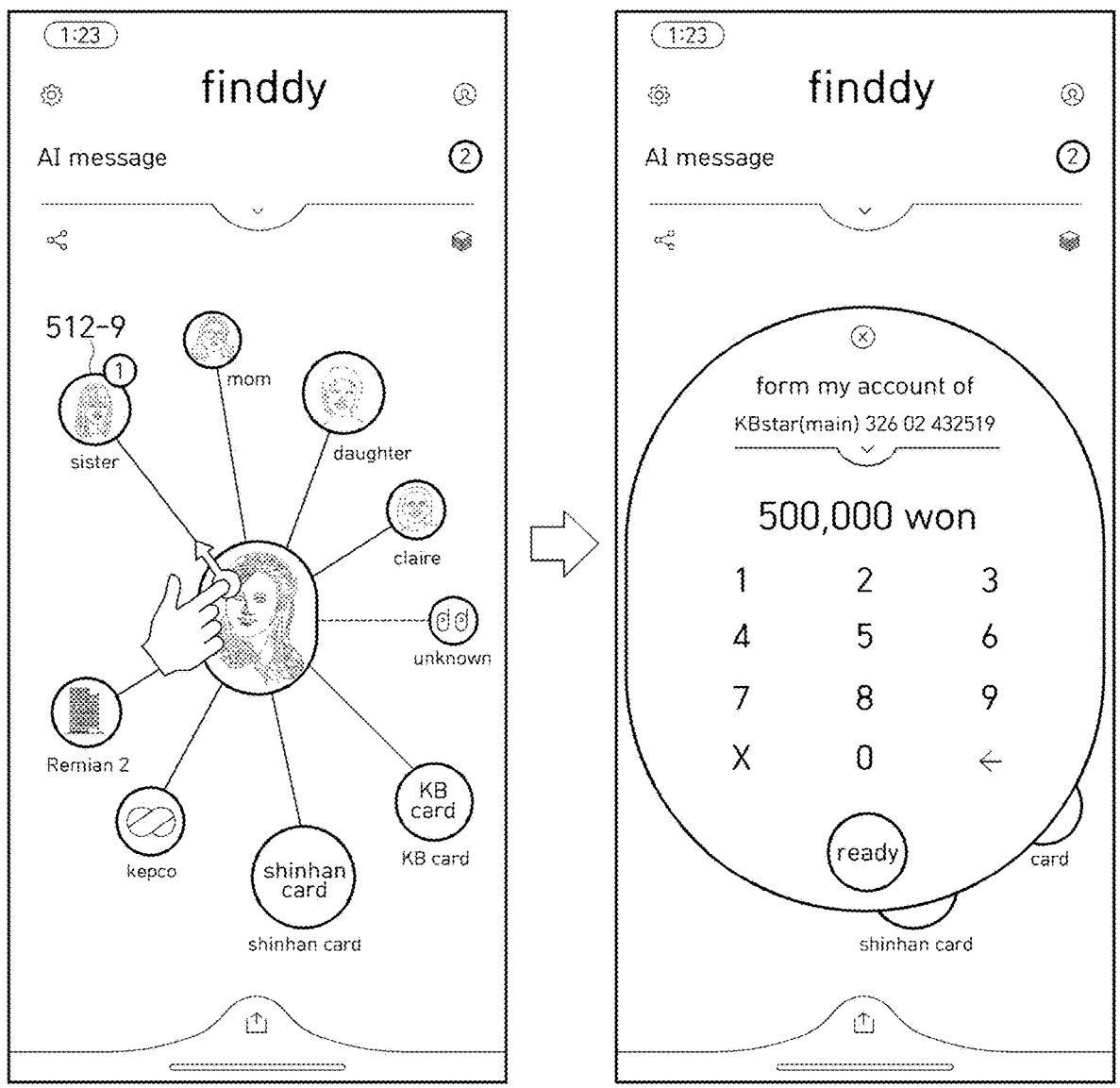

For example, referring to FIG. 9, when the first identification object 511 moves by the swipe touch input to at least partially overlap the second identification object 512-9 corresponding to [older sister], the data processing unit 220 may output an amount input window through which a user may input a remittance amount and confirm the remittance amount (e.g., 500,000 won) input by the user. Here, the data processing unit 220 may generate remittance request information including a remittance recipient and a remittance amount, and the linkage unit 230 may transmit the corresponding remittance request information to the financial service providing server 110 or the financial institution server so that 500,000 won may be remitted from the account of [user] to the account of [sister]. Meanwhile, after receiving the remittance amount from the user through the amount input window, when the first identification object 511 moves by the swipe touch input to at least partially overlap the second identification object 512-9 corresponding to [older sister], the data processing unit 220 may generate the remittance request information including the remittance recipient and the remittance amount.

In one embodiment, the user interface according to the present invention may include messenger content in which financial transaction history information between a user and a subject for financial transaction is visualized in an interactive format. Here, when a touch input signal corresponding to a request for outputting financial transaction information between a user and a corresponding subject for financial transaction is detected as a touch input signal for any one of the plurality of second identification objects 512-1 to 512-9, the data processing unit 220 may output financial transaction information between the corresponding subjects for financial transactions in an interactive format through the messenger content.

Figure 10:
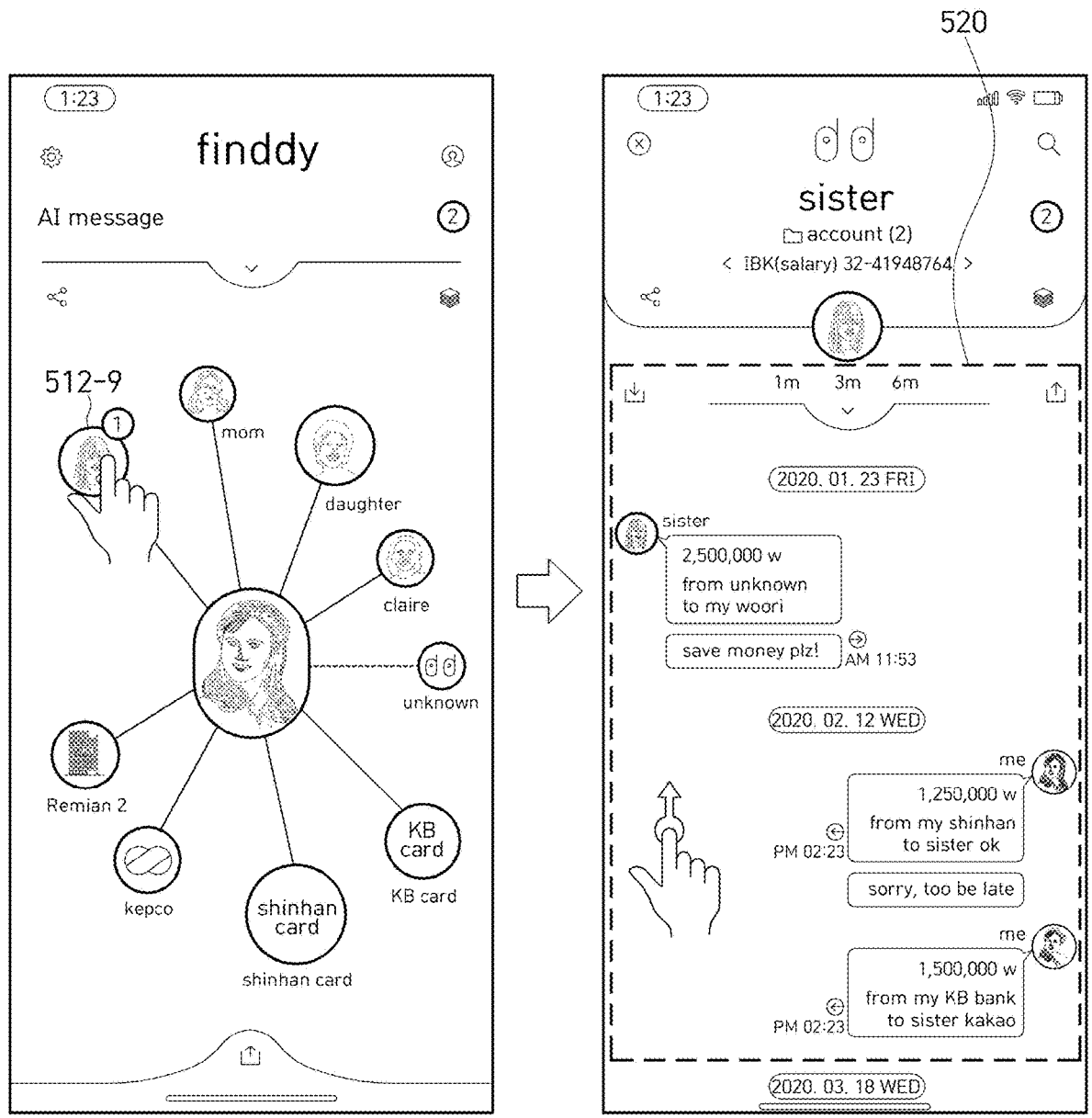

For example, referring to FIG. 10, when the single tap touch input signal for the second object is defined as the output request signal of the financial transaction information between the user and the subject for financial transaction, if the single tap touch input signal for the second identification object 512-9 corresponding to [older sister] is detected, the data processing unit 220 may output the messenger content 520 to the touch screen instead of the visualized financial relationship content 510, and output a financial transaction history between [user] and [sister] in an interactive format.

In one embodiment, the data processing unit 220 may output financial transaction history information in chronological order or in reverse chronological order through the messenger content 520, and align each of the remittance history and deposit history to the left and right, or conversely to the right and left, and output each of the remittance history and deposit history. Here, the data processing unit 220 may output text information input by a user or subject for financial transaction together with financial transaction information through the messenger content 520.

The control unit 240 may control operations and data flow of the touch input detecting unit 210, the data processing unit 220, and the linkage unit 230.

Figure 3:
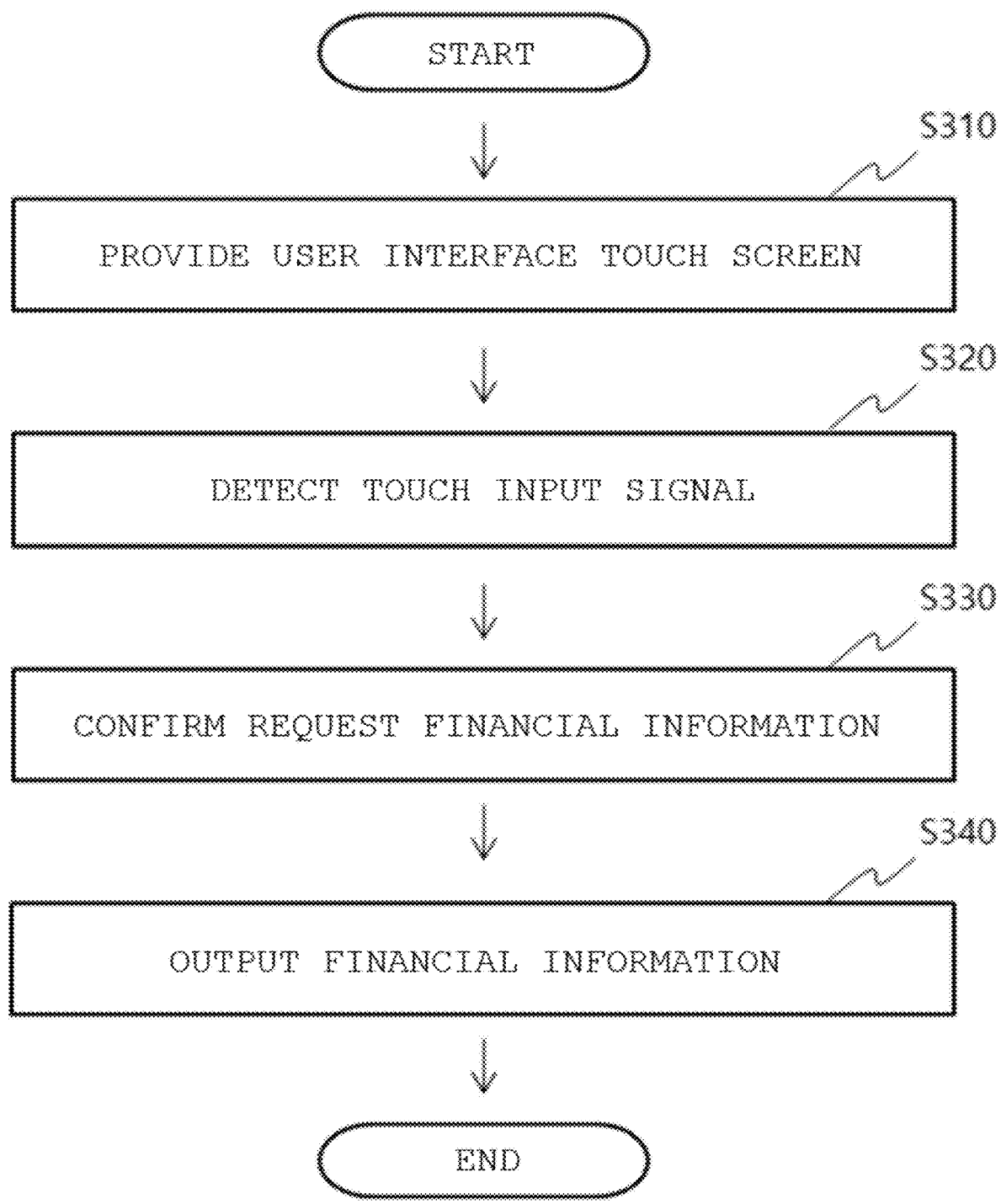
FIG. 3 is a flowchart for describing a financial service providing method according to an embodiment of the present invention.

FIG. 3 is a flowchart for describing a financial service providing method according to an embodiment of the present invention.

The data processing unit 220 provides a predefined user interface on the touch screen (step S310).

The data processing unit 220 provides the predefined user interface on the touch screen. Here, the user interface may be configured to include the visualized financial relationship content 510 that visualizes the financial relationship between the user and the subject for user's financial transaction.

In one embodiment, the visualized financial relationship content 510 may be configured to include the first identification object 511 associated with the user and the plurality of second identification objects 512-1, 512-2, 512-3, 512-4, 512-5, 512-6, 512-7, 512-8, and 512-9, associated with the subject for user's financial transaction, and may be configured to visualize the financial relationship between the user and the subject for financial transaction using the first identification object 511 and the second identification object.

The touch input detecting unit 210 detects a touch input signal input by a user (step S320). Here, the touch input signal may include at least one of a single tap touch input, a double tap touch input, a long touch input, a zoom touch input, a pinch touch input, a rotation touch input, and a swipe touch input to the first or second identification objects.

The data processing unit 220 confirms the request financial information corresponding to the user's touch input detected by the touch input detecting unit 210 (step S330). In one embodiment, the financial information output through the user interface may include at least one of financial transaction information between a user and a subject for financial transaction, user's account history information, and asset status information.

The data processing unit 220 outputs the financial information requested by the user through the user interface including the visualized financial relationship content 510 (step S340). Here, the linkage unit 230 may request corresponding financial information from the financial service providing server 110, receive the corresponding financial information from the financial service providing server 110, and provide the received corresponding financial information to the data processing unit 220.

Hereinafter, the financial service providing method according to various embodiments of the present invention will be further described with reference to FIGS. 11 to 14. Meanwhile, the financial service providing method to be described later may be performed by the touch input detecting unit 210, the data processing unit 220, the linkage unit 230, and the control unit 240 of the financial service providing apparatus 120 according to the present invention. It will be clearly understood that the financial service providing method is implemented by the operation of each component described above by a person skilled in the art belonging to the technical field of the present invention.

Figure 11:
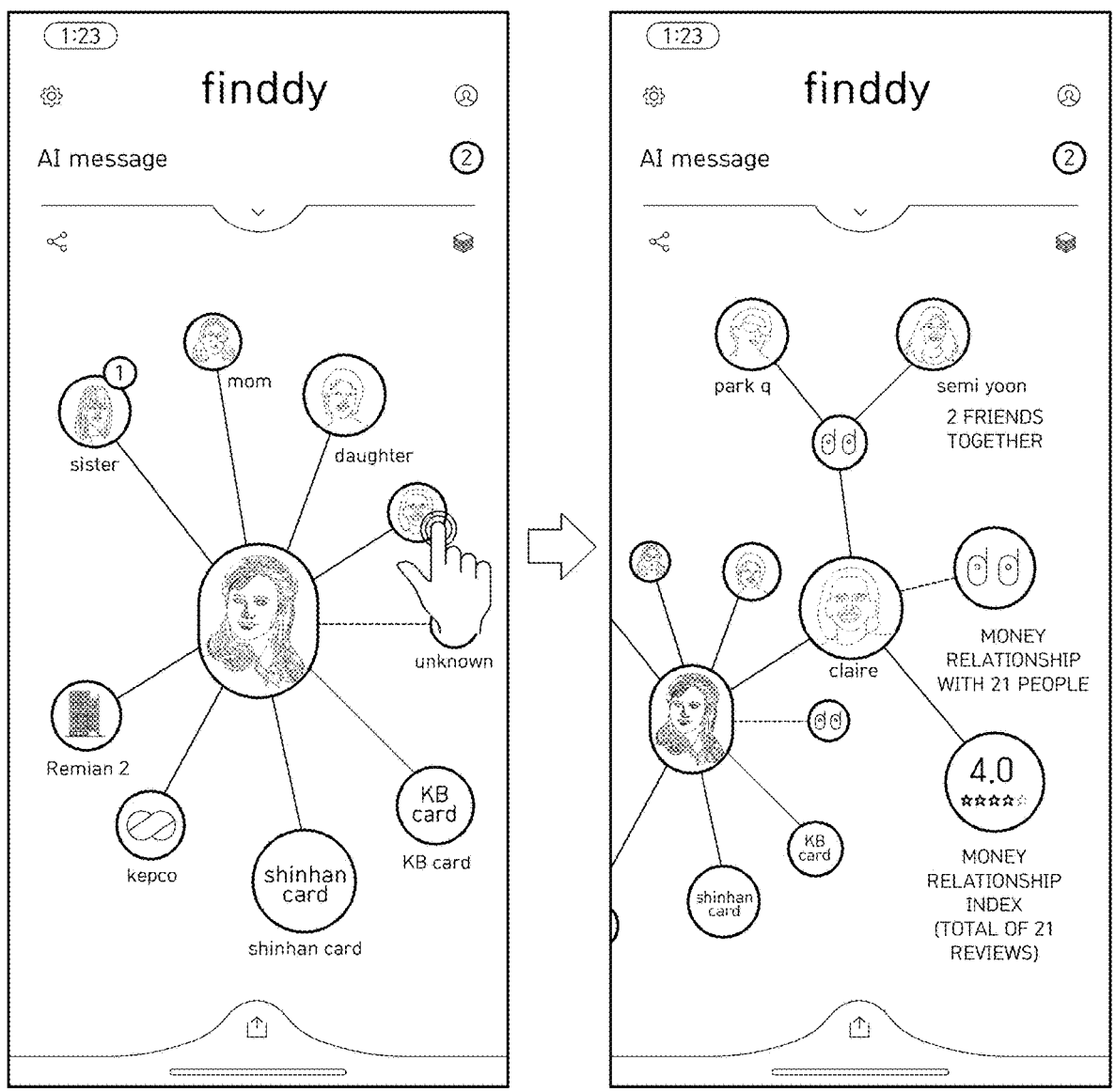

In one embodiment, the visualized financial relationship content 510 may visualize and output a financial relationship between specific subject for financial transaction of a user and subjects for financial transactions of the corresponding subject for financial transaction. For example, as illustrated in FIG. 11, when a double tap touch input to a specific second identification object (e.g., a friend) is detected, the data processing unit 220 may confirm the subject for financial transaction of the corresponding subject for financial transaction to visualize the financial relationship, and output the visualized financial relationship in association with the financial relationship.

Figure 12:
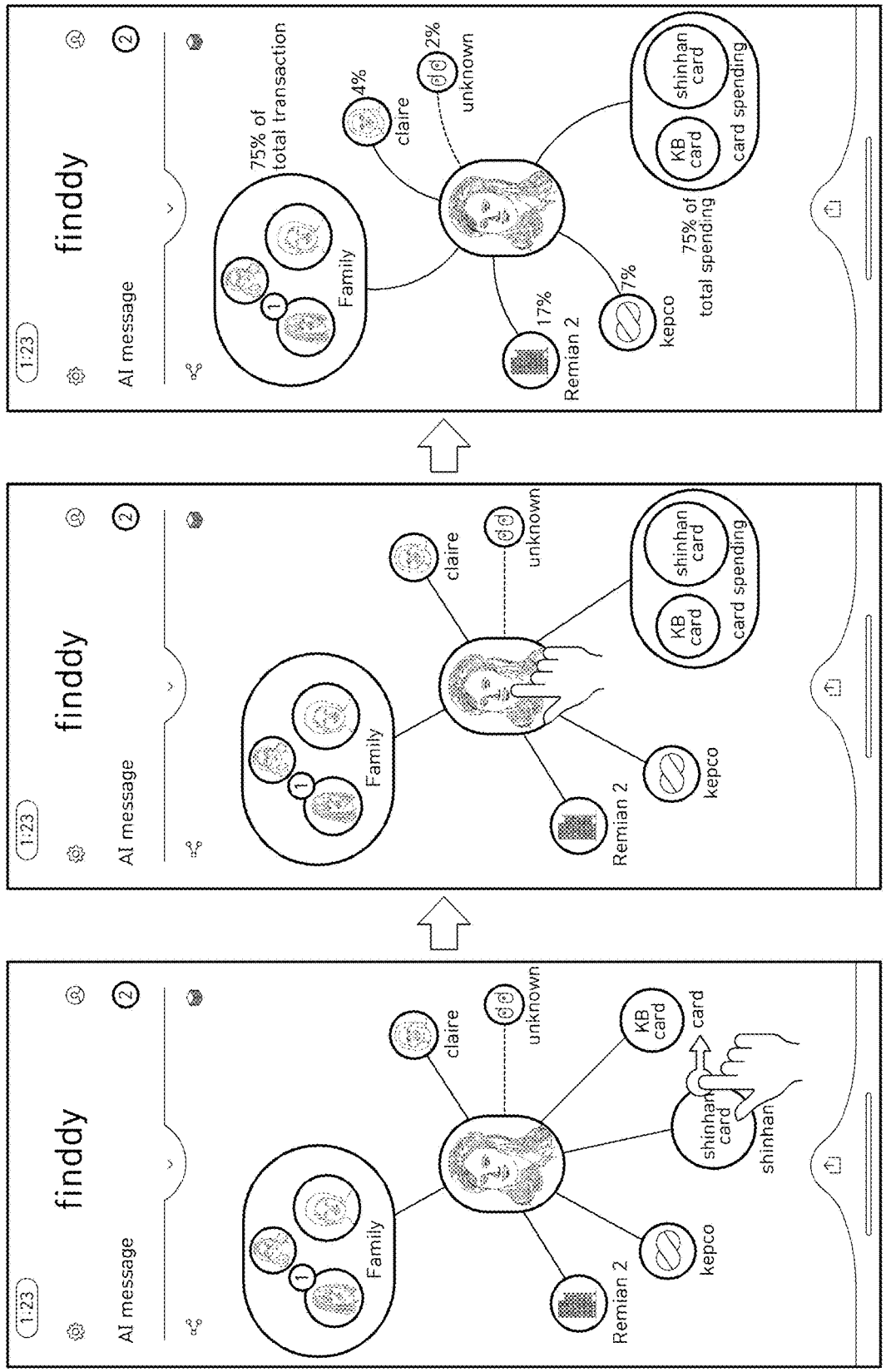

In one embodiment, the data processing unit 220 may define a plurality of groups in response to the user's touch input. As described with reference to FIG. 7, a plurality of subjects for financial transactions may be defined as one group, and as illustrated in FIG. 12, a plurality of groups may be defined by a user's additional touch input. Here, the data processing unit 220 may update and output the visualized financial relationship content 510 based on the defined grouping.

Figure 13:
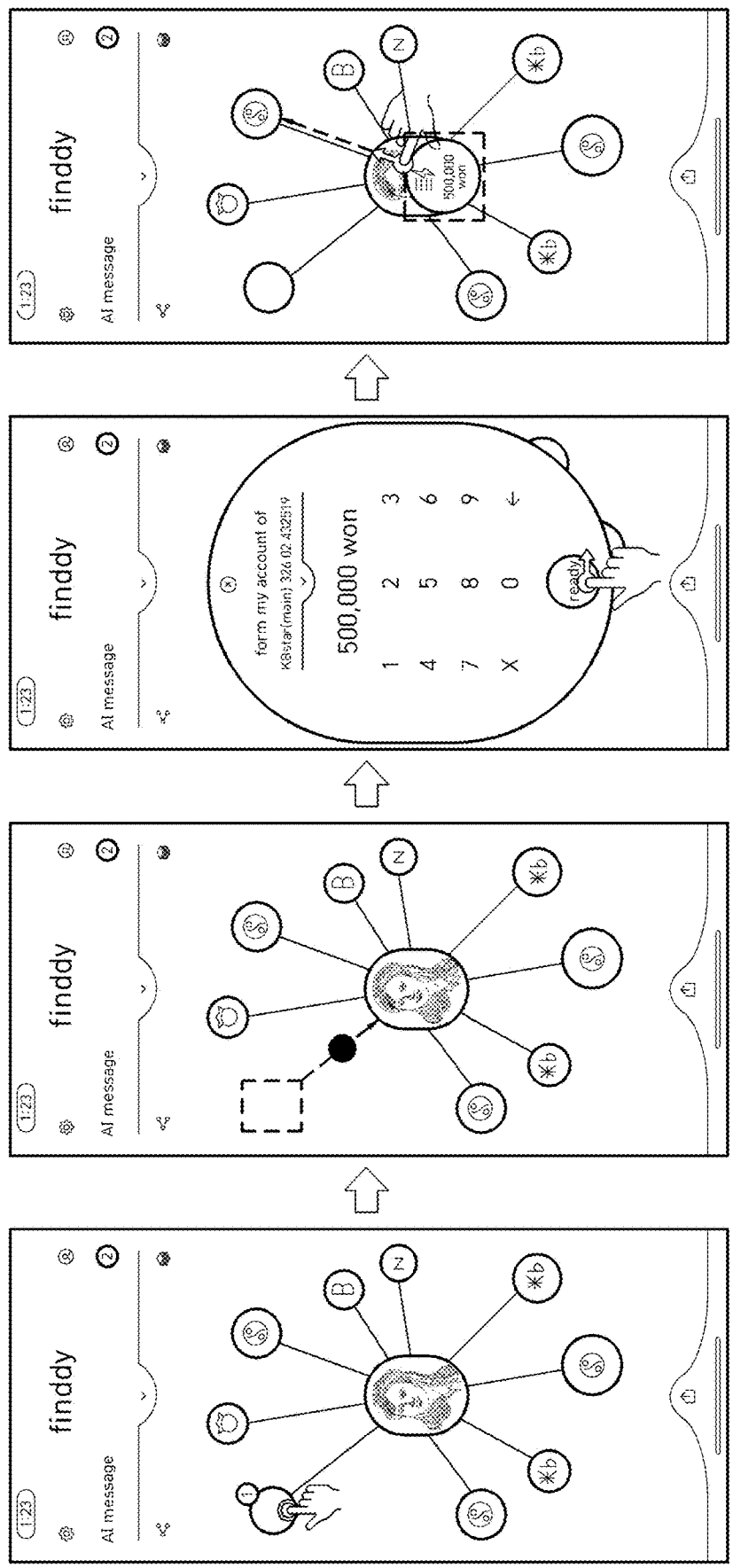

In one embodiment, the data processing unit 220 may support transfer of a certain amount from a first account to a second account of a user in response to the user's touch input. Referring to FIG. 13, the visualized financial relationship content 510 may output financial institution icons associated with an account held by a user, and when the second identification object (e.g., Kookmin Bank icon) associated with the first account moves by the user's swipe touch input to partially overlap the first identification object, the data processing unit 220 may output an amount input window through which a user may input the remittance amount, and confirm the remittance amount (e.g., 500,000 won) input by the user. In this case, the data processing unit 220 may generate and output the remittance icon displaying the remittance amount, and when the remittance icon moves by the user's swipe touch input to partially overlap the second identification object (e.g., Shinhan Bank icon) associated with the second account, the linkage unit 230 may transmit remittance request information to the financial service providing server 110 or the financial institution server so that 500,000 won is remitted from the first account to the second account.

In one embodiment, the data processing unit 220 may output asset management consulting information in response to the user's touch input.

Figure 14:
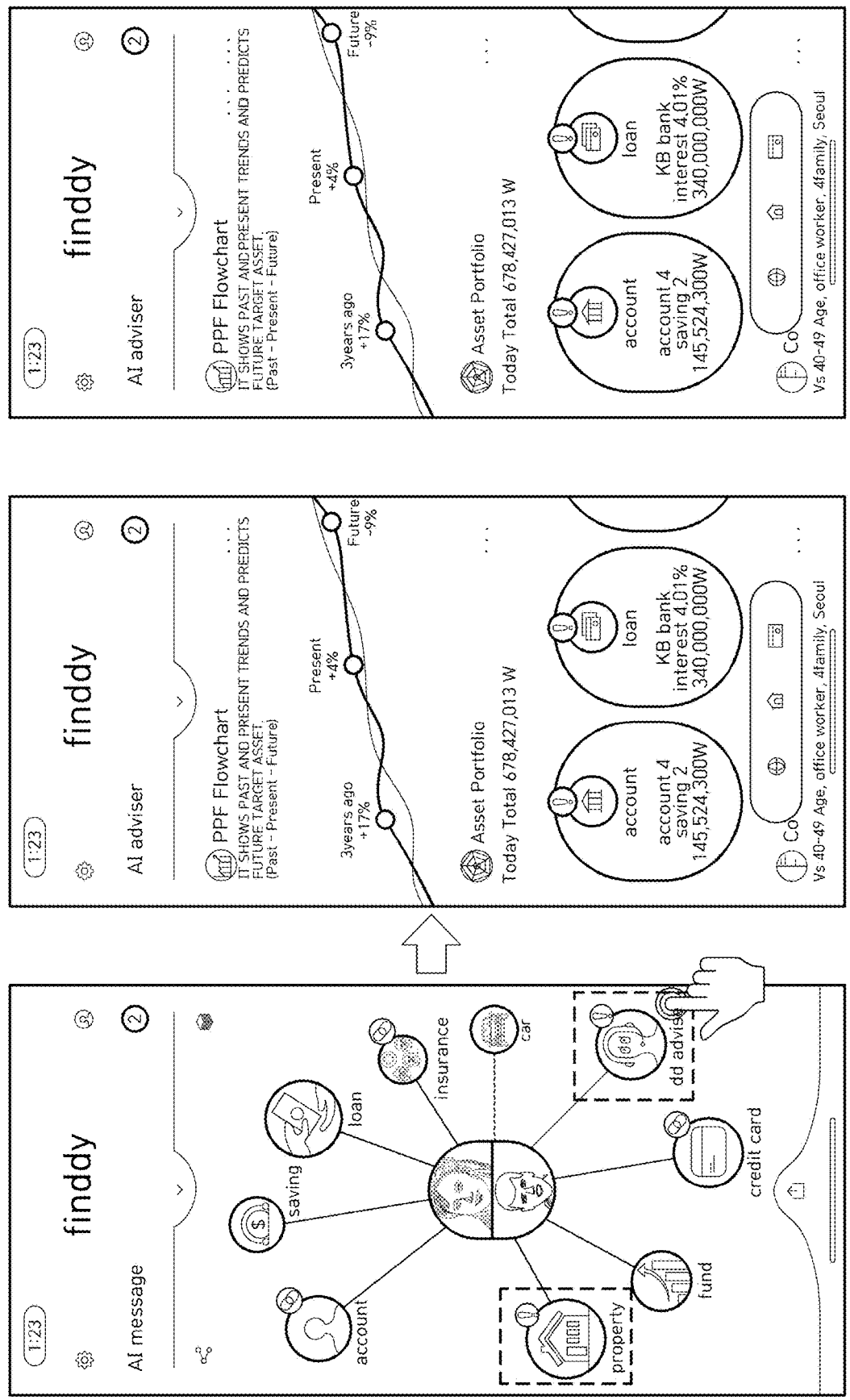

For example, referring to FIG. 14, when [user] and [husband] are grouped and defined as a joint asset manager, the data processing unit 220 may output the consulting information icon capable of confirming the asset management consulting information upon touch input. Here, when the user's single tap touch input to the consulting information icon is detected, the data processing unit 220 may output asset management consulting information about a joint asset of [user] and [husband] through a user interface.

In one embodiment, the asset management consulting information may include at least one of credit evaluation information, loan availability, loanable amount, asset prediction information, portfolio information for realizing a target asset, and asset comparison information with others.

Here, the asset management consulting information may correspond to information generated by an artificial intelligence-based robo-advisor, and may be received from the financial service providing server 110 or a separate asset management consulting information providing server.

The financial service providing method according to the present invention described above may be implemented as computer-readable code on a computer-readable recording medium. The computer-readable recording medium may include all kinds of recording apparatuses in which data that may be read by a computer system are stored. An example of the computer-readable recording medium may include a read only memory (ROM), a random access memory (RAM), a compact disk read only memory (CD-ROM), a magnetic tape, a floppy disk, an optical data storage, or the like. In addition, the computer readable recording media may be distributed in computer systems connected to each other through a network, such that the computer readable codes may be stored and executed in the computer readable recording media in a distributed scheme.

Preferred embodiments of the present invention described above have been disclosed for illustrative purposes, and those skilled in the art with ordinary knowledge of the present invention will be able to make various modifications, changes, and additions within the spirit and scope of the present invention, and these modifications, changes, and additions should be regarded as falling within the scope of the following claims.

The invention claimed is:

1. A financial service providing method using a visualized financial relationship content-based user interface (UI) performed in a financial service providing apparatus, the financial service providing method comprising:
   providing a user interface on a touch screen, the user interface including visualized financial relationship content obtained by visualizing a financial relationship between a user and a subject for financial transaction of the user;
   detecting a touch input signal input by the user through the user interface; and
   outputting financial information corresponding to the detected user's touch input, through the user interface,
   wherein the visualized financial relationship content includes a first identification object associated with the user and a plurality of second identification objects associated with the subject for financial transaction, and the financial relationship between the user and the subject for financial transaction is visualized using the first and second identification objects,
   wherein the plurality of second identification objects include natural person objects and corporation or institution objects, the natural person objects are differently displayed from the corporation or institution objects, each of the natural person objects is shown with a photo image of a respective natural person and also with one of name, nickname and relationship of the respective natural person, and each of the corporation or institution objects is shows an icon representing a respective corporation or institution and also with a text of a name of the respective corporation or institution,
   wherein the first identification object is arranged at a predefined position, and each of the plurality of second identification objects is arranged at a position spaced apart from the first identification object, and the first identification object and each of the plurality of second identification objects are configured to be connected in a star shape through a link object,
   wherein the outputting of the financial information through the user interface further includes, when a touch input signal corresponding to a request for outputting financial transaction information between the user and the subject for financial transaction is detected as a touch input signal for the first identification object, updating the visualized financial relationship content based on the financial transaction information,
   wherein the updating of the visualized financial relationship content includes visually changing sizes of the plurality of second identification objects, respectively, in proportion to a transaction amount or a transaction frequency between the user and the subject for financial transaction,
   wherein the updating of the visualized financial relationship content further includes visually displaying percentage information of a total transaction, for each second identification object of the plurality of second identification objects, adjacent to each second identification object of the plurality of second identification objects,
   wherein the outputting of the financial information through the user interface includes, when one second identification object of the plurality of second identification objects moves by a swipe touch input to the one second identification object of the plurality of second identification objects, to at least partially overlap other second identification objects, grouping and defining subjects for financial transaction associated with each of the overlapping second identification objects, and updating the visualized financial relationship content in response to the grouping, and
   wherein the outputting of the financial information through the user interface further includes:
   generating a joint asset management group identification object of the grouped subjects, and displaying the joint asset management group identification object with photo images of the grouped subjects; and
   updating the visualized financial relationship content to additionally display asset information icons of joint assets of the grouped subjects, and to additionally display additional link objects connecting the asset information icons with the joint asset management group identification object.

2. The financial service providing method of claim 1, wherein the outputting of the financial information through the user interface includes requesting financial information corresponding to the detected touch input signal from a financial service providing server connected through a network to output the financial information received from the financial service providing server through the user interface.

3. The financial service providing method of claim 1, wherein the touch input signal includes, as a touch input signal for at least one of the first identification object and the plurality of second identification objects, at least one of a single-tap touch input, a double-tap touch input, a long touch input, and the swipe touch input.

4. The financial service providing method of claim 1, wherein the updating of the visualized financial relationship content includes visually changing the link object in response to at least one of the transaction amount and the transaction frequency between the user and the subject for financial transaction.

5. The financial service providing method of claim 1, wherein the outputting of the financial information through the user interface further includes, when the one second identification object of the plurality of second identification objects moves by the swipe touch input to the one second identification object of the plurality of second identification objects, to at least partially overlap the first identification object, grouping and defining the subject for financial transaction associated with the user and the one second identification object of the plurality of second identification objects as a joint asset manager, and updating the visualized financial relationship content in response to the grouping.

6. The financial service providing method of claim 1, wherein the outputting of the financial information through the user interface further includes, when the first identification object moves by another swipe touch input to the first identification object to at least partially overlap another second identification object of the plurality of second identification objects, generating remittance request information for remitting a predetermined amount to a subject for financial transaction associated with the another second identification object of the plurality of second identification objects, and transmitting the remittance request information to a financial service providing server or a financial institution server.

7. The financial service providing method of claim 1, wherein the user interface includes messenger content in which financial transaction history information between the user and the subject for financial transaction is visualized in an interactive format.

8. The financial service providing method of claim 7, wherein the outputting of the financial information through the user interface further includes, when a touch input signal corresponding to a request for outputting financial transaction information between the user and the subject for financial transaction is detected as a touch input signal for any one of the plurality of second identification objects, outputting the financial transaction information between the corresponding subjects for financial transactions in the interactive format through the messenger contents.

9. The financial service providing method of claim 1, wherein the updating of the visualized financial relationship content further includes visually changing thicknesses of link objects to the plurality of second identification objects, respectively, in proportion to the transaction amount or the transaction frequency between the user and the subject for financial transaction.

10. A financial service providing apparatus for performing a financial service providing method using a visualized financial relationship content-based user interface (UI), the financial service providing apparatus comprising:
  a data processing unit configured to provide a user interface on a touch screen, the user interface including visualized financial relationship content obtained by visualizing a financial relationship between a user and a subject for financial transaction of the user; and
  a touch input detecting unit configured to detect a touch input signal input by the user through the user interface,
  wherein the data processing unit outputs financial information corresponding to the detected user's touch input, through the user interface,
  wherein the visualized financial relationship content includes a first identification object associated with the user and a plurality of second identification objects associated with the subject for financial transaction, and the financial relationship between the user and the subject for financial transaction is visualized using the first and second identification objects,
  wherein the plurality of second identification objects include natural person objects and corporation or institution objects, the natural person objects are differently displayed from the corporation or institution objects, each of the natural person objects is shown with a photo image of a respective natural person and also with one of name, nickname and relationship of the respective natural person, and each of the corporation or institution objects is shows an icon representing a respective corporation or institution and also with a text of a name of the respective corporation or institution,
  wherein the first identification object is arranged at a predefined position, and each of the plurality of second identification objects is arranged at a position spaced apart from the first identification object, and the first identification object and each of the plurality of second identification objects are configured to be connected in a star shape through a link object,
  wherein the data processing unit, in outputting of the financial information through the user interface, further performs, when a touch input signal corresponding to a request for outputting financial transaction information between the user and the subject for financial transaction is detected as a touch input signal for the first identification object, updating the visualized financial relationship content based on the financial transaction information,
  wherein the data processing unit, in the updating of the visualized financial relationship content, performs visually changing sizes of the plurality of second identification objects, respectively, in proportion to a transaction amount or a transaction frequency between the user and the subject for financial transaction, and
  wherein the data processing unit, in the updating of the visualized financial relationship content, further performs visually displaying percentage information of a total transaction, for each second identification object of the plurality of second identification objects, adjacent to each second identification object of the plurality of second identification objects,
  wherein the data processing unit, in the outputting of the financial information through the user interface, further performs, when one second identification object of the plurality of second identification objects moves by a swipe touch input to the one second identification object of the plurality of second identification objects, to at least partially overlap other second identification objects, grouping and defining subjects for financial transaction associated with each of the overlapping second identification objects, and updating the visualized financial relationship content in response to the grouping, and
  wherein the data processing unit, in the outputting of the financial information through the user interface, further performs:
  generating a joint asset management group identification object of the grouped subjects, and displaying the joint asset management group identification object with photo images of the grouped subjects; and
  updating the visualized financial relationship content to additionally display asset information icons of joint assets of the grouped subjects, and to additionally display additional link objects connecting the asset information icons with the joint asset management group identification object.

11. The financial service providing apparatus of claim 10, further comprising a linkage unit configured to request financial information corresponding to the detected touch input signal to a financial service providing server connected through a network and receive the corresponding financial information from the financial service providing server and provide the received financial information to the data processing unit.

12. A computer-readable recording medium, which is non-transitory and storing a computer program on a financial service providing method using a visualized financial relationship content-based user interface (UI) performed in a financial service providing apparatus, wherein the financial service providing method includes the functions of:

providing a user interface on a touch screen, the user interface including visualized financial relationship content obtained by visualizing a financial relationship between a user and a subject for financial transaction of the user;

detecting a touch input signal input by the user through the user interface; and outputting financial information corresponding to the detected user's touch input, through the user interface, wherein the visualized financial relationship content includes a first identification object associated with the user and a plurality of second identification objects associated with the subject for financial transaction, and the financial relationship between the user and the subject for financial transaction is visualized using the first and second identification objects, wherein the plurality of second identification objects include natural person objects and corporation or institution objects, the natural person objects are differently displayed from the corporation or institution objects, each of the natural person objects is shown with a photo image of a respective natural person and also with one of name, nickname and relationship of the respective natural person, and each of the corporation or institution objects is shows an icon representing a respective corporation or institution and also with a text of a name of the respective corporation or institution, wherein the first identification object is arranged at a predefined position, and each of the plurality of second identification objects is arranged at a position spaced apart from the first identification object, and the first identification object and each of the plurality of second identification objects are configured to be connected in a star shape through a link object, wherein the outputting of the financial information through the user interface further includes, when a touch input signal corresponding to a request for outputting financial transaction information between the user and the subject for financial transaction is detected as a touch input signal for the first identification object, updating the visualized financial relationship content based on the financial transaction information, wherein the updating of the visualized financial relationship content includes visually changing sizes of the plurality of second identification objects, respectively, in proportion to a transaction amount or a transaction frequency between the user and the subject for financial transaction, and wherein the updating of the visualized financial relationship content further includes visually displaying percentage information of a total transaction, for each second identification object of the plurality of second identification objects, adjacent to each second identification object of the plurality of second identification objects, wherein the outputting of the financial information through the user interface includes, when one second identification object of the plurality of second identification objects moves by a swipe touch input to the one second identification object of the plurality of second identification objects, to at least partially overlap other second identification objects, grouping and defining subjects for financial transaction associated with each of the overlapping second identification objects, and updating the visualized financial relationship content in response to the grouping, and wherein the outputting of the financial information through the user interface further includes:

generating a joint asset management group identification object of the grouped subjects, and displaying the joint asset management group identification object with photo images of the grouped subjects; and updating the visualized financial relationship content to additionally display asset information icons of joint assets of the grouped subjects, and to additionally display additional link objects connecting the asset information icons with the joint asset management group identification object.

* * * * *